Dec. 20, 1960  R. R. HOWLETT  2,965,121
VALVE FOR PRESSURE FLUID FLOW CONTROL
Filed July 6, 1959

Inventor
REX RICHARD HOWLETT
By
Aaron R. Townshend  Attorney

United States Patent Office 2,965,121
Patented Dec. 20, 1960

2,965,121

VALVE FOR PRESSURE FLUID FLOW CONTROL

Rex Richard Howlett, Wanstead, London, England, assignor to The British Oxygen Company Limited, a British company Filed July 6, 1959, Ser. No. 825,011

3 Claims. (Cl. 137—116.5)

This invention relates to a valve for the flow control of pressure fluid, and has for its object to provide a valve for incorporation in a pressure fluid flow line which will close when a first predetermined value of fluid pressure is attained in said flow line, and which will re-open when a predetermined value of back pressure in excess of said first predetermined value is attained.

The valve of the present invention is intended primarily for use with a converter system in which liquefied gas stored in a container is fed therefrom in controlled quantities, according to demand, for vaporisation and consumption. Flow of liquefied gas from the container into a delivery line is effected by a so-called build-up circuit, which essentially comprises a conduit extending between the liquid and gaseous phases of the container and containing a vaporizer coil and a pressure-actuated valve which closes when a predetermined gas pressure is attained in the build-up circuit. This gas pressure is provided by a gravitational flow of liquefied gas into the vaporizer of the build-up circuit, and results in pressurization of the gaseous phase of the liquefied gas container by the build-up circuit until the pressure-closing valve operates at a predetermined pressure to isolate the liquid and gaseous phases of the container from each other. Flow of liquefied gas into the delivery line upon demand is ensured by this pressurizing of the container, and it will be appreciated that the pressure-closing valve re-opens when the internal pressure of the container falls sufficiently, whereupon the build-up circuit again becomes operative to restore the pressure. It will also be appreciated that if there is no demand for gas when the pressure-closing valve has closed, the internal pressure of the container could build up to an excessive value, and it is customary to provide a relief valve for venting gas to atmosphere from the container under such conditions. Wastage of gas by venting the container to atmosphere has been reduced by providing an economiser conduit which extends between the gaseous phase of the container and the delivery line and contains a pressure-actuated valve which opens at a predetermined pressure which is higher than the pressure at which the pressure-closing valve closes, but less than the pressure at which the relief valve operates. The operation of this pressure-opening valve provides some measure of economy of gas in reducing wastage by venting gas from the container into the delivery line.

An object of the invention, in connection with converter systems, is to provide a valve which combines the functions of a pressure-closing valve and a pressure-opening valve.

A valve according to the present invention comprises a casing divided by an internal partition having an aperture into a pressure chamber and a secondary chamber, each provided with a flow passage leading to the exterior of the casing, a movable valve member having a longitudinal bore through its body being slidable endwise with clearance in said aperture and being resiliently urged into fluid-tight engagement, so as to close one end of said bore, with a seating carried by a pressure-responsive contractible and expansible element which is located in the pressure chamber and is resiliently urged into an expanded condition, the valve member having that portion thereof which is in the secondary chamber formed with an annular seating capable of engagement with a complementary seating surrounding the aperture in the partition, and the expanded condition of the pressure-responsive element being such that the resilient loading thereof balances the resilient loading of the valve member with the valve member held clear of the partition so as to open said aperture, the range of contraction of the pressure-responsive element being sufficiently greater than the clearance between the annular valve seating and the seating on the partition to provide for closing of the aperture in the partition followed by opening of the bore in the valve member.

In the application of the valve to a converter system, the pressure chamber is connected to the gaseous phase of the converter and the secondary chamber is in communication with both the liquid phase of the converter and the delivery line, so that the valve operates as a pressure-closing valve in a build-up circuit, and also as a pressure-opening valve which vents the gaseous phase of the container into the delivery line via the build-up circuit, thereby obviating the necessity for a separate economiser conduit.

In a further feature of the invention the pressure-responsive element is resiliently urged to its expanded condition by one or more springs, and means are provided for varying the initial loading of said spring or springs for varying the operational characteristics of the valve. The valve member may also be resiliently loaded by one or more springs, and means may also be provided for varying the initial loading of said spring or springs, thereby providing a further means for effecting variation of the operational characteristics of the valve.

The pressure chamber may be ventable by means of a relief valve which is opened mechanically in response to a predetermined degree of contraction of the pressure-responsive element.

The secondary chamber in the valve casing may also house a non-return valve which is resiliently urged into engagement with a complementary seating surrounding the bore in the valve member, and at the opposite end of said member to the end which engages the pressure-responsive element.

The secondary chamber may be ventable by means of a pressure relief valve which is actuated by the pressure fluid.

An embodiment of the invention will now be described with reference to the accompanying drawings, in which.

Figure 1:
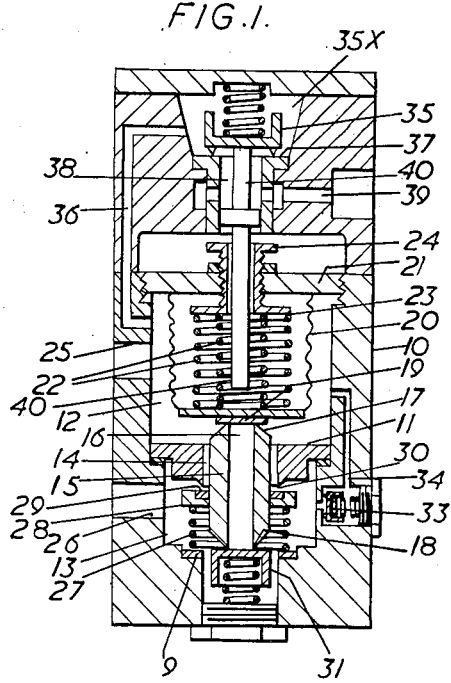
Fig. 1 is a schematic cross-sectional elevation of a valve constructed according to the invention.

Referring to Fig. 1 of the drawings, a generally cylindrical valve casing 10 has its interior divided by a transverse partition 11 to provide a pressure chamber 12 and a secondary chamber 13. The partition 11 has a central aperture 14 in which is positioned an elongated valve member 15 having a central axial bore 16. The valve member 15 extends to both sides of the partition 11, and there is clearance between the valve member and the aperture 14 in the partition for the passage of pressure fluid between the chambers 12 and 13.

Both ends of the valve member 15 are formed as respective valve seatings 17 and 18, and the seating 17 which is in the pressure chamber 12 engages a complementary seating 19 carried by one end of a pressure-responsive element in the form of metallic bellows 20 in the pressure chamber. The other end of the bellows 20 is secured to a transverse wall 21 of the casing 10 and compression springs 22 are provided within the bellows 20 so as to urge the bellows into an expanded condition. The springs 22 act between the end of the bellows which carries the valve seating 19 and a pressure plate 23 which is carried by an adjusting screw 24. The latter extends through the transverse wall 21, of the valve casing and the screw can be rotated to vary the initial loading of the springs 22. A lateral passage 25 opens into the pressure chamber 12 through the wall of the valve casing 10, and a similar lateral passage 26 opens into the secondary chamber 13.

The valve member 15 is resiliently urged towards the bellows 20 by a loading spring 27 which acts between the casing 10 and an annular flange 28 on that portion of the valve member 15 which is in the secondary chamber 13, and adjustment of the initial loading of this spring 27 is also provided for, as by shims indicated at 9 or by an adjusting screw (not shown). It will be appreciated that it is the initial loading of the spring 27 which determines the difference between the two values of pressure at which the valve "pressure opens" and "pressure closes" respectively. The face of the annular flange 28 on the valve member which confronts the partition 11 is provided with an annular valve seating 29, while a complementary valve seating 30 on the partition 11 surrounds the aperture 14 therein. The initial loadings of the springs 22 in the bellows 20 and the opposing spring 27 which acts on the valve member 15 are such that the annular seating 29 carried by the flange 28 on the valve member 15 is normally held clear of the seating 30 surrounding the aperture 14 in the partition 11, as is depicted in the drawing.

A non-return valve 31 in the secondary chamber is spring-loaded into engagement with the valve seating 18 at that end of the valve member 15 opposite to the valve seating 17 which engages the seating 19 on the bellows 20. The secondary chamber 13 is ventable by means of a spring-loaded pressure relief valve 33, the valve being opened by pressure fluid when the pressure in the secondary chamber 13 reaches a predetermined value to allow venting of the chamber 13 into the chamber 12 via a passage 34 in the casing 10.

The portion of the valve casing 10 on the opposite side of the transverse wall 21 to the bellows 20 is formed to house a spring-loaded relief valve 35, by means of which the pressure chamber 12 is ventable. A chamber 35$^x$ which contains the relief valve 35 is in communication with the pressure chamber 12 via a passage 36 in the valve casing. The relief valve 35 is spring-loaded against a seating 37 so as normally to close a vent to atmosphere via an axial passage 38 which joins a radial passage 39 extending to the exterior of the valve casing. The valve 35 cannot be opened by the pressure of fluid in the chamber 35$^x$, and the valve is actually opened mechanically by means of an axially disposed push rod 40 which slides in piston fashion in the axial passage 38, and extends through the adjusting screw 24 into the interior of the bellows 20 for actuation thereby as hereafter described.

In operation of the valve, it will be seen from the drawing that initially the pressure chamber 12 and the secondary chamber 13 are in communication with each other through the aperture 14 in the partition 11, but when pressure within the pressure chamber 12 reaches a predetermined value the bellows 20 commence to contract, compressing the springs 22 therein, assisted by the springs which act upon the valve member 15 and the non-return valve 31. Eventually the annular seating 29 carried by the flange 28 on the valve member 15 engages the annular seating 30 on the partition 11, thereby closing the aperture 14 in the partition and isolating the pressure chamber 12 from the secondary chamber 13. The bellows 20 is therefore relieved of the action of the loading springs of the valve member 15 and the non-return valve 31, and is acted upon solely by the pressure in the pressure chamber 12. A pressure within the pressure chamber 12 considerably in excess of that required to contract the bellows sufficiently to allow the valve member 15 to close the aperture 14 in the partition 11 is necessary to contract the bellows 20 still further and raise the valve seating 19 carried by the bellows 20 from the complementary seating 17 on the end of the valve member 15, but when this further contraction of the bellows 20 does take place, communication between the pressure chamber 12 and the secondary chamber 13 is re-established through the bore 16 of the valve member 15, the non-return valve 31 being raised from its seating 18 on the other end of the valve member 15.

Thus it will be seen that pressure in a system in which the valve is incorporated will act to close the valve when a predetermined value of pressure is attained, and when a predetermined higher pressure is attained in the pressure chamber 12, the valve will re-open.

Figure 2:
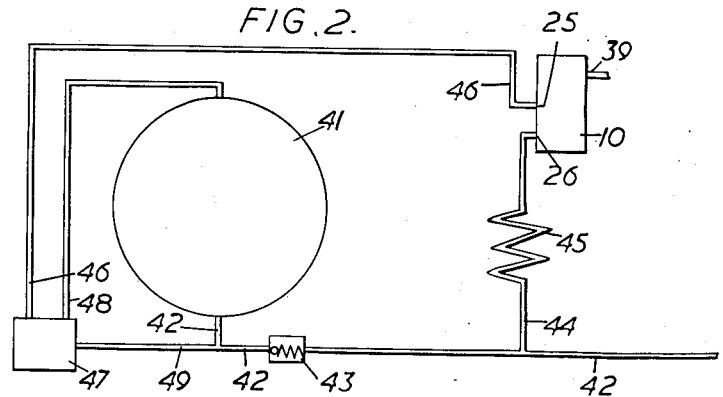
Fig. 2 is a lay-out diagram depicting a converter system for liquefied gases which includes the valve of the present invention.

Referring now also to Fig. 2 of the drawings, the valve is shown incorporated in a converter system for liquefied gas, the converter vessel being shown at 41. A conduit 42 leads from the base of the vessel 41 to feed liquefied gas into a delivery line 42 past a non-return valve 43. Extending from the delivery line 42 is a branch conduit 44 containing an evaporating coil 45, and it will be seen by comparison with Fig. 1 that the conduit 44 joins the valve of the present invention via the lateral passage 26 leading to the secondary chamber 13. The conduit 44 with its evaporating coil 45 is the build-up circuit of the converter system.

A conduit 46 extends from the passage 25 of the pressure chamber 12, and connects via a filler valve 47 with another conduit 48 which extends from the valve 47 to the top of the converter vessel 41.

The filler valve 47 need not be explained in detail, since it is sufficient to state that it is used when filling the vessel 41 via a filler line 49 which joins delivery line 42 of the vessel 41, said delivery line 42 being employed as an inlet line only when filling and re-filling the vessel 41 with liquefied gas.

It will be appreciated from the foregoing that the pressure chamber 12 of the valve of Fig. 1 is in communication with the top of the converter vessel 41 via the conduits 46 and 48, and since there is a space above liquefied gas in the converter vessel which contains vaporised gas, the pressure chamber 12 is connected with the "gas phase" of the vessel 41. Similarly, the secondary chamber 13 is in communication with the "liquid phase" of the vessel 41 via the abovementioned build-up circuit and the delivery line 42.

When the vessel 41 is newly filled with liquefied gas, there is a feed of the liquefied gas by gravity into the build-up circuit conduit 44 and evaporating coil 45. Gas vaporised in the coil 45 commences to pressure the system via the valve casing 10 and conduits 46, 48 and thereby also pressurizing the gas phase of the vessel 41 so that the feed of liquefied gas into the delivery line 42 is promoted by the pressure thus generated in the system.

It will now be appreciated that the pressure generated in the pressure chamber 12 by the operation of the build-up circuit will eventually close the valve, to stop the action of the build-up circuit by isolating the gas phase of the vessel 41 from the liquid phase via the valve, i.e. when the system reaches a predetermined normal operating pressure. This normal operating pressure is maintained during operation of the system for supplying liquefied gas to the delivery line 42 for consumption according to demand, since the valve will re-open with a pressure drop below the normal operating pressure to allow the build-up circuit to function again.

This is the first function of the valve shown in Fig. 2, viz. as a pressure-closing valve for controlling the functioning of the build-up circuit. The purpose of the relief valve 33 is now apparent, its function and setting being to prevent excessive "back-pressure" developing in the build-up circuit while the system is standing pressurised but not in use, but also to maintain a slight pressure differential of the "liquid phase" delivery side of the system over the "gas phase" side of the system under such conditions, to prevent loss of liquid gas from the vessel 41 under gravity head. This back pressure disappears as soon as the system is brought into use.

If there is no demand for supply of gas in the delivery line 42, pressure in the gas phase of the converter tends to increase to a value above the normal operating pressure and this pressure rise is present in the chamber 12. As already explained the valve also operates as a pressure-opening valve, and this pressure rise in the chamber 12 eventually contracts the bellows 20 to disengage the seatings 17 and 19. Gas then flows through the bore 16 of the valve member 15 from the gas phase of the converter system, into the build-up conduit 44 and thence into the delivery line 42, where it is available for consumption, rather than being vented immediately directly to atmosphere. The build-up circuit therefore has a secondary function as an economiser circuit, so that the valve of the present invention functions firstly as the pressure build-up valve but also provides an economiser system integral with the build-up circuit, because the valve also functions as a pressure-opening valve which vents the gaseous phase of the vessel 41 into the delivery line 42 when the gas pressure within the container reaches a predetermined value in excess of the pressure required to operate the pressure-closing valve.

Referring again to Fig. 2 it may be that in operation an excessively high pressure is reached in the gas phase of the converter system, even after the bellows 20 have contracted sufficiently to separate the valve seats 17 and 19 to re-connect the chambers 12 and 13. The result is that the bellows 20 is still further contracted, and that the push rod 40 is eventually moved endwise by the bellows to open the relief valve 35, whereby the chamber 12 is vented to atmosphere. The relief valve 35 is therefore a high pressure safety valve for the converter system as a whole.

It will be seen that the invention provides a single valve which performs at least a double function, thereby providing advantages of economy in manufacturing costs and a saving in weight and space, and while particular reference has been made to the use of the valve in a converter system, its use is not limited to this particular application, since its employment is also envisaged in other circumstances where its simplicity of construction will be appreciated and its advantages can be realised.

What I claim is:

1. A combined pressure-closing and pressure-opening valve for pressure fluid flow control, comprising a casing, an internal partition which has an aperture therein, and which divides said casing into a pressure chamber and a secondary chamber, there being passages in the casing connecting each chamber with the exterior thereof, a movable valve member having a longitudinal bore through its body slidable with lateral clearance in and through said aperture so that the valve member has its respective end portions disposed in the respective chambers, an annular flange supported by that portion of said valve member which is located in the secondary chamber, an annular valve seating carried by said annular flange, a complementary seating on said partition confronting said annular valve seating for engagement thereby, first resilient means biasing said valve member in direction to engage said seatings, a pressure-responsive contractible and expansible element in the pressure chamber, second resilient means biasing said element to expanded condition, a valve seating carried by said element in confronting relationship with that end of the valve member which is located in the pressure chamber, for engagement therewith to close the bore of said valve member, the expanded condition of the pressure-responsive element being such that the resilient loading thereof balances the resilient loading of the valve member with a clearance between said annular valve seating and the complementary seating on the partition, and the range of contraction of the pressure-responsive element being sufficiently greater than said clearance to provide for closing of the aperture in the partition followed by opening of the bore in the valve member, a pressure relief valve for venting said pressure chamber, an operative connection between said relief valve and said pressure-responsive element whereby predetermined contraction of said element opens said valve, a second pressure relief valve in the secondary chamber for venting the latter into the pressure chamber via a passage which interconnects said chambers, a non-return valve in the secondary chamber, a complementary valve seat which surrounds the bore of the valve member at that end of the valve member which is located in the secondary chamber, and spring means biasing said non-return valve into engagement with said valve seat.

2. A combined pressure-closing and pressure-opening valve for pressure fluid flow control, comprising a casing, an internal partition which has an aperture therein, and which divides said casing into a pressure chamber and a secondary chamber, there being passages in the casing connecting each chamber with the exterior thereof, a movable valve member having a longitudinal bore through its body slidable with lateral clearance in and through said aperture so that the valve member has its respective end portions disposed in the respective chambers, an annular flange supported by that portion of said valve member which is located in the secondary chamber, an annular valve seating carried by said annular flange, a complementary seating on said partition confronting said annular valve seating for engagement thereby, first spring means for resiliently biasing the valve member in direction to engage said seating, means for varying the initial loading of said spring means, a pressure responsive contractible and expansible element in the pressure chamber, second spring means biasing said element to expanded condition, means for varying the initial loading of said second spring means, a valve seating carried by said element in confronting relationship with that end of the valve member which is located in the pressure chamber, for engagement therewith to close the bore of said valve member, the expanded condition of the pressure-responsive element being such that the resilient loading thereof balances the resilient loading of the valve member with a clearance between said annular valve seating and the complementary seating on the partition, and the range of contraction of the pressure-responsive element being sufficiently greater than said clearance to provide for closing of the aperture in the partition followed by opening of the bore in the valve member, a pressure relief valve for venting said pressure chamber, an operative connection between said relief valve and said pressure-responsive element whereby predetermined contraction of said element opens said valve, a second pressure relief valve in the secondary chamber for venting the latter into the pressure chamber via a passage which interconnects said chambers, a non-return valve in the secondary chamber, a complementary valve seat which surrounds the bore of the valve member at that end of the valve member which is located in the secondary chamber, and spring means biasing said non-return valve into engagement with said valve seat.

3. A combined pressure-closing and pressure-opening valve for pressure fluid flow control, comprising a casing, an internal partition which has an aperture therein and which divides said casing into a pressure chamber and a secondary chamber, there being passages in the casing connecting each chamber with the exterior thereof, a movable valve member which has a longitudinal bore through its body and is slidable endwise with lateral clearance in and through said aperture so that the valve member has its respective end portions disposed in the respective chambers, an annular flange supported by that portion of the valve member which is located in the secondary chamber, an annular valve seating carried by said annular flange, a complementary seating on said partition confronting said annular seating on the valve member, first spring means biasing said valve member in direction to engage said seatings, means for adjusting the initial loading of said first spring means, an expansible and contractible metallic bellows in said pressure chamber, second spring means biasing said bellows to expanded condition, means for adjusting the initial loading of said second spring means, a valve seating carried by said bellows in confronting relationship with the end of the valve member which is located in the pressure chamber and biased into engagement with said end under the combined action of both said spring means for closing the bore of said valve, the expanded condition of the bellows being such that the spring means thereof balances the spring means of the valve member with a clearance between the annular seating of the valve member and the complementary seating on the partition and the range of contraction of the bellows being greater than said clearance to provide that closing of the aperture in the partition is followed by opening of the bore in the valve member, a first pressure relief valve in said casing for venting the pressure chamber, a push rod carried by said metallic bellows for engagement with and operation of said first relief valve upon predetermined contraction of said bellows, a second pressure-actuated relief valve in said secondary chamber which is operative to vent the latter into the pressure chamber via a passage which interconnects said chambers, a non-return valve in the secondary chamber, a complementary valve seat which surrounds the bore of the valve member at that end of the valve member which is located in the secondary chamber, and spring means biasing said non-return valve into engagement with said valve seat.

References Cited in the file of this patent
UNITED STATES PATENTS 2,707,966    Taplin _____ May 10, 1955